(12) United States Patent
Pietrek

(10) Patent No.: US 8,540,187 B2
(45) Date of Patent: Sep. 24, 2013

(54) MUSCLE-POWERED AIRCRAFT WITH FLAPPING WINGS

(76) Inventor: Nikolaus Pietrek, Falkensee (DE)

( * ) Notice: Subject to any disclaimer, the term of this patent is extended or adjusted under 35 U.S.C. 154(b) by 158 days.

(21) Appl. No.: 12/746,903

(22) PCT Filed: Dec. 15, 2008

(86) PCT No.: PCT/EP2008/010651
§ 371 (c)(1),
(2), (4) Date: Aug. 26, 2010

(87) PCT Pub. No.: WO2009/074349
PCT Pub. Date: Jun. 18, 2009

(65) Prior Publication Data
US 2011/0121129 A1    May 26, 2011

(30) Foreign Application Priority Data
Dec. 13, 2007   (DE) .......................... 10 2007 060 176

(51) Int. Cl.
*B64C 31/04*    (2006.01)

(52) U.S. Cl.
USPC .............................................. 244/64; 244/22

(58) Field of Classification Search
USPC .............. 244/22, 23 C, 11, 4 A, 38, 218, 219, 244/64, 72, 900
See application file for complete search history.

(56) References Cited

U.S. PATENT DOCUMENTS 1,940,961 A * 12/1933 Mascow ........................... 244/22
2,112,107 A *  3/1938 Lutschg ........................... 244/22

FOREIGN PATENT DOCUMENTS

| AT | 102 017 | | 12/1925 |
|---|---|---|---|
| CH | 348 326 | A | 8/1960 |
| DE | 568 062 | C | 1/1933 |
| DE | 826 820 | | 1/1952 |
| DE | 29 09 975 | A1 | 9/1980 |
| DE | 33 14 130 | A1 | 10/1984 |
| DE | 35 37 365 | C2 | 4/1987 |
| DE | 37 31 210 | A1 | 4/1989 |
| DE | 195 09 774 | A1 | 9/1996 |
| FR | 2 797 844 | A | 3/2001 |
| FR | 2797844 | A1 * | 3/2001 |

* cited by examiner

OTHER PUBLICATIONS

International Search Report for corresponding PCT application No. PCT/EP2008/010651 dated Jul. 29, 2009.

*Primary Examiner* — Timothy D Collins
*Assistant Examiner* — Brian M O'Hara
(74) *Attorney, Agent, or Firm* — Wood, Phillips, Katz, Clark & Mortimer

(57) ABSTRACT

The invention relates to a muscle-powered ornithopter comprising a fuselage, a pair of flapping wings which have an alterable profile or a rudder in an outer wing region located at a distance from the fuselage, said alterable profile or rudder allowing the uplift to be modified in a predefined flow, and an elevator unit in which the deflection of the elevator can be modified. The pair of flapping wings and the fuselage are made of an elastic material, the elasticity of which allows the pair of flapping wings to be flapped. The flapping wings are curved downward in a resting position. The elasticity is calculated such that the flapping wings are urged into a neutral position during a flight because of the pilot's weight. The fuselage is designed to accommodate the pilot in an upright position relative to a longitudinal axis of the fuselage such that the pilot can apply stress to and relieve stress from the aircraft in phases by stretching and bending his or her legs. The ornithopter further comprises mechanisms which allow the alterable outer wing regions and the modifiable deflection of the elevator to be actuated in phase with the movement of the flapping wings.

14 Claims, 15 Drawing Sheets

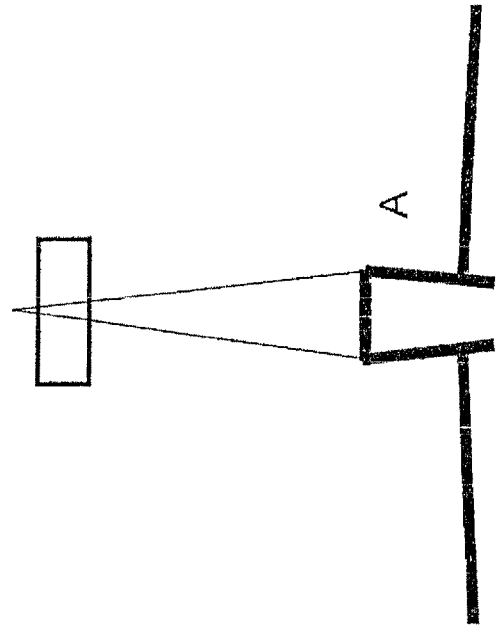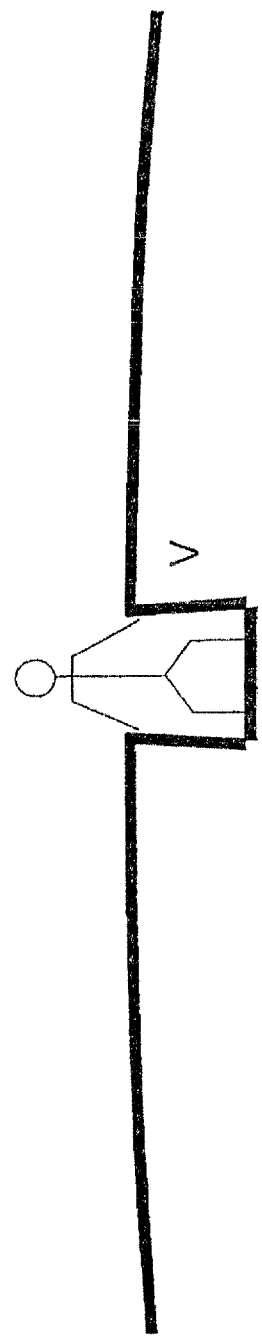

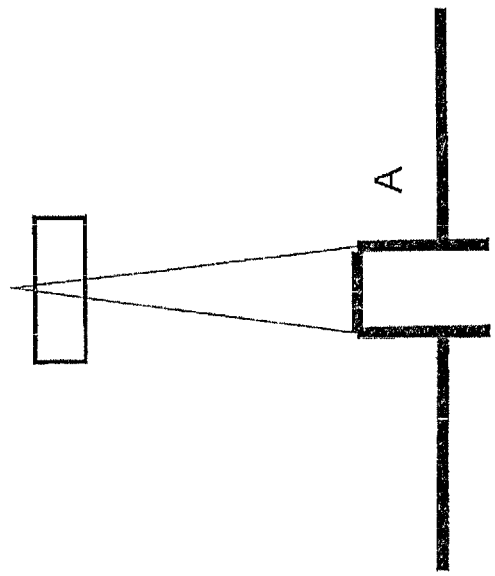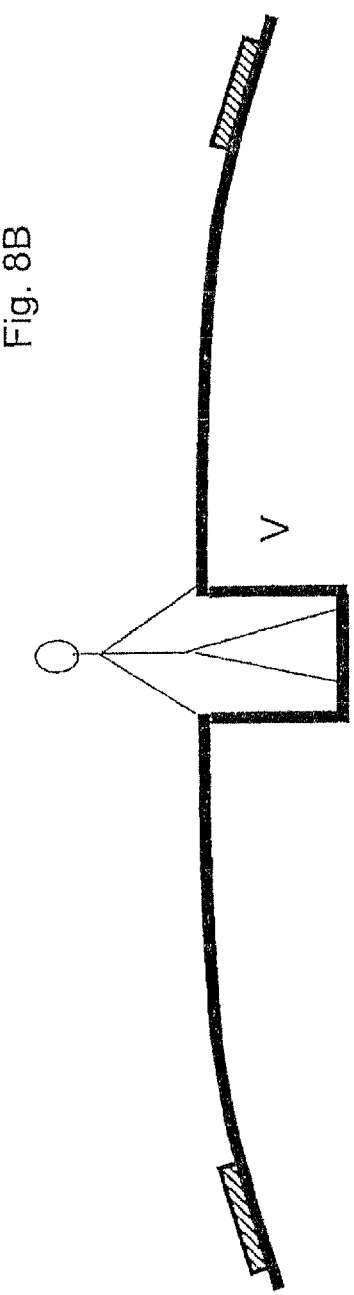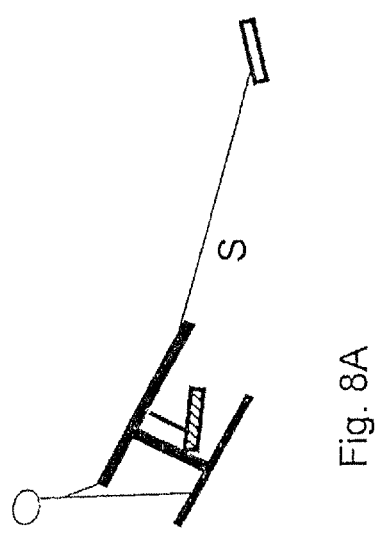

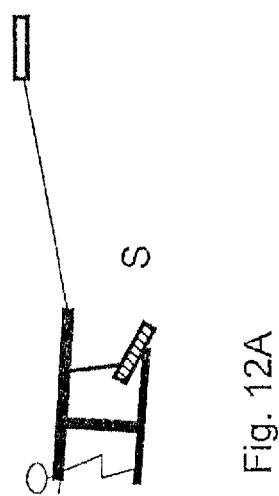
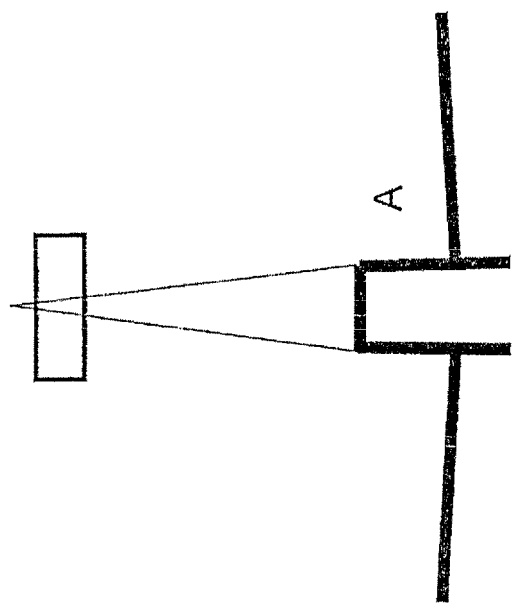
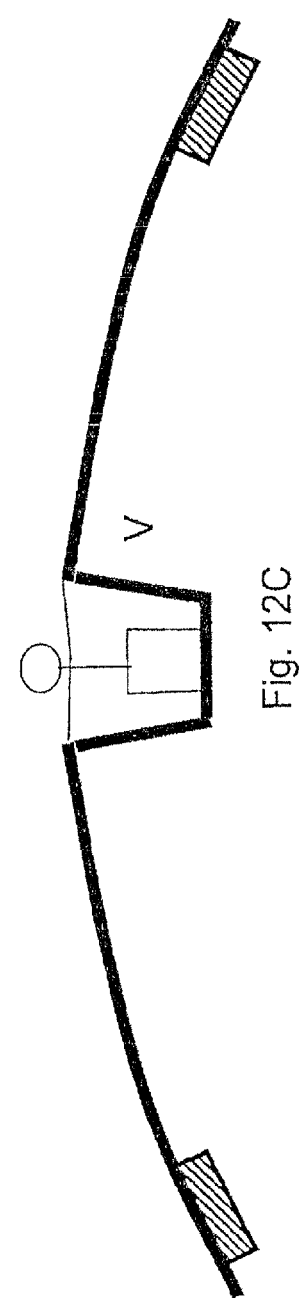

MUSCLE-POWERED AIRCRAFT WITH FLAPPING WINGS

FIELD OF THE INVENTION

The invention relates to an aircraft with flapping wings, also known as an ornithopter, which is operated by muscle power.

BACKGROUND OF THE INVENTION

The state of the art is familiar with several concepts for making available motorised and non-motorised aircraft with flapping wings.

However, so far there have only been reports of a few successful attempts. In 1942, Adalbert Schmid succeeded in taking off with a motor-driven device and in flying it a short distance. In 2006, a motor-driven ornithopter flown by Prof. James De Laurier managed to fly about 300 meters. In addition, he made use of a booster turbine for extra speed. One feature that both machines had in common was a pair of fixed auxiliary wings that gave continuous uplift in the right flow conditions, and a pair of flapping wings that provided for the acceleration.

It is hard to say how successful Emil Hartmann was with his flapping-wing flight in 1960, as it was propelled forwards by a rubber band that was used to start the flight and then to continue it with the aid of a pair of flapping wings. The power required for the flapping of the wings was provided by the arms of the pilot by means of levers and baffle plates.

The muscle power that a pilot may summon up with his arms alone in order to operate the flapping wings is probably not sufficient in order to successfully imitate the prolonged flapping motion of a bird in flight. Accordingly, other prior-art aircraft envisage using the pilot's leg movement to drive the flapping wings. For example, one elaborate method of turning leg motion into flapping wing motion is described in German patent specification DE 35 37 365 C2.

Other proposals for muscle-powered ornithopters, such as are described in the German patent specifications DE 19 50 970 074 A1 and DE 29 09 975 A1, envisage the application of force by means of mass acceleration of the body of the pilot. However, these concepts ignore the complicated sequence of motion that is necessary in order to successfully imitate the flight of a bird. Furthermore, these concepts also ignore the important role that the position of the elevator unit plays in the different phases of the flapping of the main wings.

The latter publications describe rigid wings that are straight in two planes, and which may only perform a two-dimensional flapping motion because they are mounted on a rotational axis. By way of contrast, the wings of birds describe a kind of rowing motion and during the course of this movement they change portions of their wing profile.

The wing-flapping flight of the bird is facilitated first and foremost by the bird's sequence of motion between the bird's primaries and secondaries. With an up-and-down motion of the wings, the wing performs a rowing movement in its outer region—and with the bird, this corresponds to the primary,— while the section of the wing close to the fuselage—with the bird, this corresponds to the secondary—, keeping much the same angle of adjustment. When in the upward flight phase, the bird adjusts the primary so that it achieves greater uplift. On the other hand, the primary is adjusted negatively during the downward flight phase so that it generates only a slight uplift, or no uplift at all. In this way, the primary can provide the necessary propulsion, while the secondary can ensure constant uplift.

BRIEF SUMMARY OF THE INVENTION

It is the objective of the present invention to provide an aircraft with flapping wings, in imitation of the flight of a bird, which efficiently takes into account the bio-mechanism of the human body in order to achieve muscle-powered propulsion.

This objective is achieved by an aircraft with flapping wings according to claim 1, or by a method of operating the aircraft with flapping wings according to claim 13.

The invention envisages an aircraft with flapping wings which has a fuselage, a pair of flapping wings that have an alterable profile or a rudder in an outer wing region that is at a distance from the fuselage, which facilitates an alteration of uplift in a predetermined flow, and an elevator unit with an alterable pitch elevator deflection, wherein the pair of flapping wings and the fuselage are shaped from an elastic material having an elasticity that facilitates a flapping motion of the pair of wings, wherein the flapping wings are curved downwards in a resting position and the elasticity is gauged in such a way that the flapping wings are forced into a neutral position during flight by the weight of the pilot, wherein the fuselage is arranged so as to accommodate the pilot in an upright position with respect to the longitudinal axis of the fuselage so that the pilot may apply stress to and relieve stress from the aircraft by stretching and drawing in his legs, wherein the aircraft furthermore has mechanical means that facilitate operation of the alterable outer region of the wing and of the alterable pitch elevator deflection in phase with the motion of the flapping wings.

The aircraft of the present invention facilitates the imitation of bird flight by the alterable outer flight regions and/or the rudder and the alterable pitch elevator deflection, respectively. Furthermore, the aircraft according to the invention supports force transmission to generate the flapping wing motion in an advantageous manner. In particular, the aircraft does not envisage the use of mechanical joints to carry out the flapping wing motion, such as are commonplace in prior-art technology. Instead of this, the flapping wings are fixedly attached to the fuselage, wherein flapping wing motion is made possible solely by elasticity. The flapping wings are forced into a neutral position, i.e. closer in direction to an approximately straight extension, by the uplift exerted on the flapping wings during flight on the one hand, and by the weight of the pilot on the other. For this purpose, the fuselage is designed to accommodate the pilot in an upright position that enables him to apply stress to and relieve stress from the aircraft by stretching and drawing in his legs. During flight this has the effect of turning upwards the flapping wings when stress is applied to the aircraft, while a downward wing swing occurs when stress is relieved from the aircraft. The alterable outer wing regions and the modifiable pitch elevator deflection are also significant for the imitation of bird flight. The alterable rudder adjustment may be effected mechanically by the pilot, or automatically as a function of the position of the flapping wings, e.g. by a suitable mechanical coupling.

In a preferred embodiment, the aircraft has a flexible inner frame that surrounds the pilot on at least two sides and upon which the flapping wings are mounted. The frame can also be integrated in a flexible monocoque structure. The frame may also feature a non-supportive covering so as to improve the aerodynamic properties in the region of the fuselage.

Preferably, the frame is elastically deformable transversely to the longitudinal axis of the aircraft. The deformability of the frame transversely to the longitudinal axis facilitates rudder motion and supports the movement of the flapping wings in this embodiment.

In one embodiment of the invention, both the fuselage as well as the wings are at least in part formed from a flexible monocoque structure.

The alterable outer wing regions are formed by at least one rudder within the region of the trailing edge of the wing in one embodiment of the invention. Alternatively, the entire outer wing region can also be moved in the manner of an all moving tail. In another embodiment of the invention, also the profile can be altered within the region of the alterable outer wing regions. For example, the wing is of flexible construction in this region and a mechanical device is provided in order to move the leading edge of the wing with respect to the trailing edge of the wing, whereby the adjustment angle for the wing changes in this region.

In accordance with one embodiment of the invention, the aircraft has several parallel spars in order to constitute the flapping wings. The spars are fixedly connected to the fuselage. They enable the desired flexibility to be incorporated into the construction by a varied selection of materials or material thicknesses.

The alterable outer wing regions and/or the pitch elevator deflection can be manually operated by the pilot, using control rods and/or cable pulls. Alternatively, the controls for the outer wing regions and/or the pitch elevator deflection may also be coupled to movement of the flapping wings. In the latter embodiment, an additional mechanical device may be envisaged which enables the pilot still to superimpose a desired movement on the movement that has been automatically predetermined, for example, in order to facilitate a pitch elevator deflection or a rudder angle in a conventional manner.

Furthermore, the invention provides a method of operating the aircraft with flapping wings. The method largely depends on the pilot being able to apply stress to and relieve stress from the aircraft. The flapping wing motion is induced during the phased application and relief of stress.

In accordance with one embodiment of the invention, the pilot actuates the alterable outer wing regions and/or the pitch elevator deflection in phase with applying and relieving stress, e.g. by a manual device. Alternatively or additionally, the alterable outer wing region and/or pitch elevator deflection may also be brought about automatically.

Relieving stress from the aircraft may be effected by the pilot completely leaving the aircraft with his legs so that the pilot is moving independently of the aircraft as a ballistic body during this phase of the flight.

Steering of the aircraft can be achieved by a horizontal displacement of body weight. For example, as for a hang glider, steering can be achieved by both about the longitudinal axis as well as the lateral axis of the aircraft by shifting the of body weight alone.

BRIEF DESCRIPTION OF THE DRAWINGS

A preferred embodiment and an example of a preferred flight mode of the invention are described in the following with the attached figures.

FIG. 1a shows two cross-sections of the deformable wing tips according to FIG. 1

FIGS. 6A-15C give a schematic representation of the aircraft with flapping wings in the different flight phases, as well as the body position to be adopted by the pilot, wherein S represents the side view, A the top view and V the front view.

DETAILED DESCRIPTION OF THE INVENTION

The present invention provides a lightweight, portable aircraft that can be started by the pilot running against the wind, with a flexible frame and curved wings that are fixedly connected thereto, and which without detour are directly brought into flapping action in flight by means of a mass acceleration of the body of the pilot, wherein by way of their construction they are able to complete the rudder motion imitating birds during flight and are continuously variable in their shape. The flapping amplitude bears a direct dependency on the amount of force applied by the pilot at the same flapping frequency. In their shape and bio-mechanical properties, the wings of the aircraft are intended as a crude approximation of the wings of birds. During flight, the wings are forced in a stretched shape by the weight of the pilot and by the uplift that is generated, by virtue of their curvature and the characteristic profile. The standing pilot has enough space available to position his body in any direction on a large enough bearing surface if necessary and thus to influence the centre of mass of the combination of pilot/ornithopter. In addition, by accelerating his body above the legs, the pilot is able to vary the rhythm and amount of force at any time, or if needed let it go for a short time in order to make flight-dynamic use of the inertia of his bodyweight, which is much greater than that of the aircraft. In order to influence the rate of flapping, the pilot can bring the wing tips into a more or less curved position by means of cable pulls or a linkage and thus convert the uplift arising at the wing tips into a negative lift. There is a suitable angle of adjustment in each case for the down-stroke as well as for the upstroke and/or for an individual wing profile shape. In this way, the pilot succeeds in achieving an optimum harmonisation of flapping frequency, flapping amplitude and control of force input.

Figure 1:
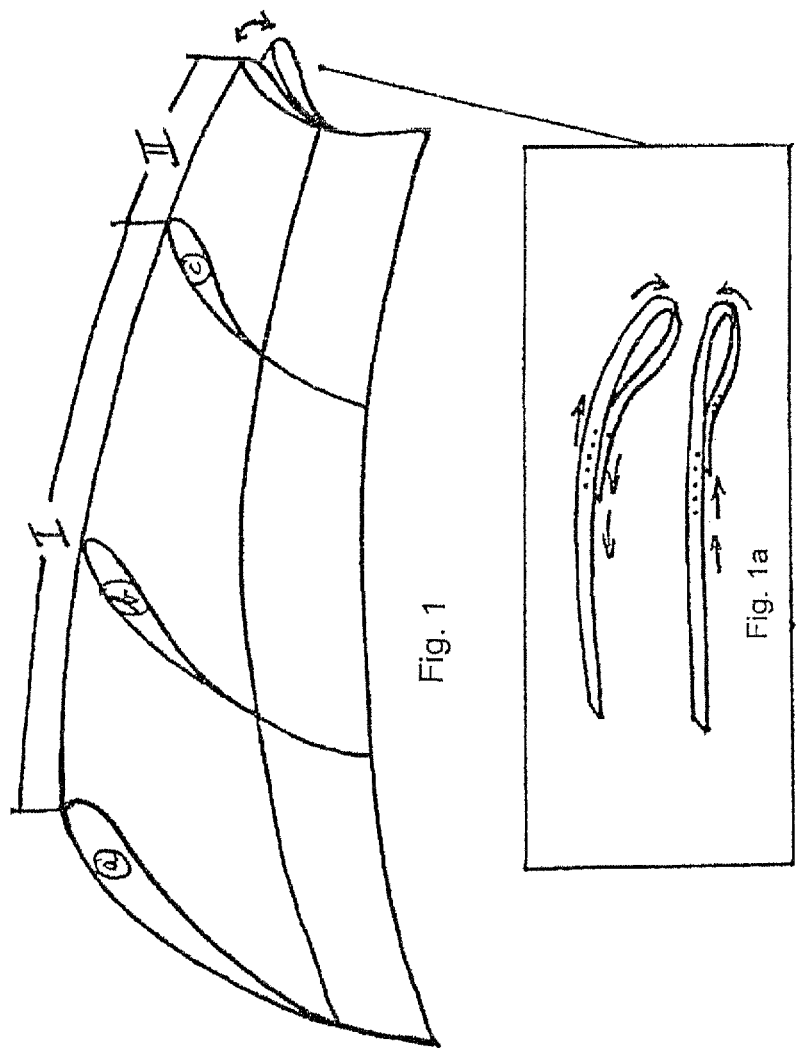
FIG. 1 shows schematically the structure of one of the flapping wings with deformable wing tips
Figure 2:
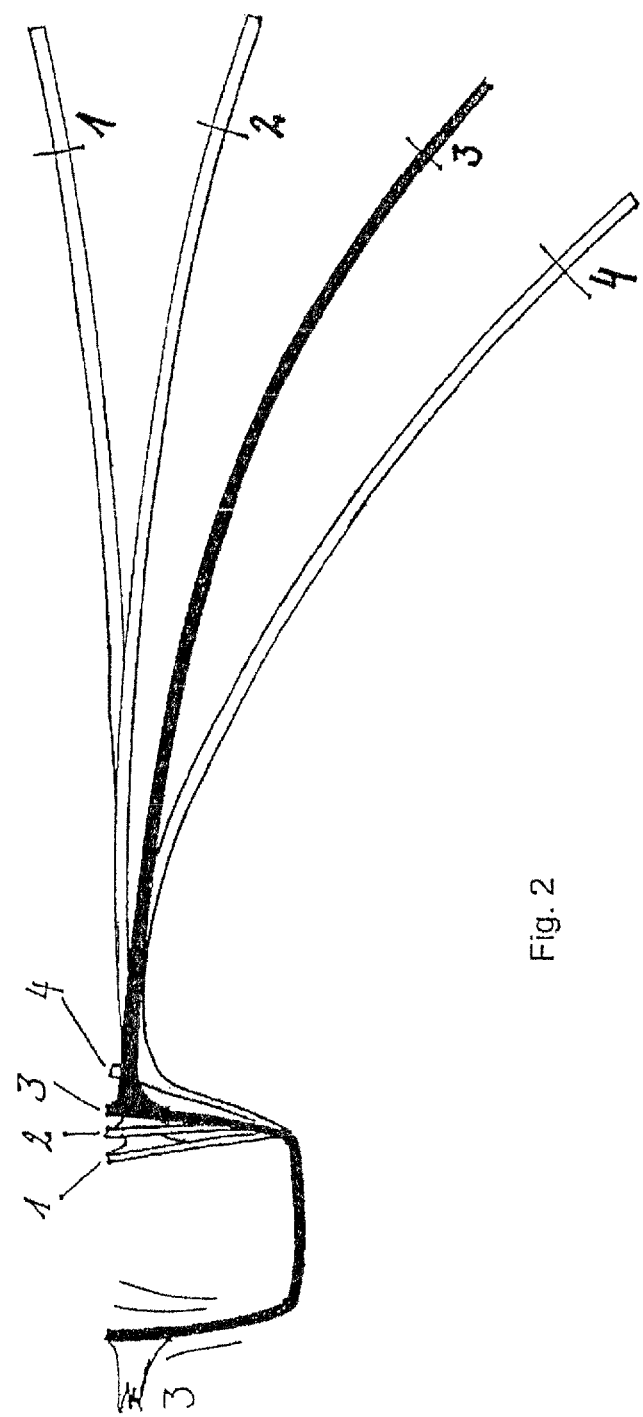
FIG. 2 is a schematic front-view illustration of the various degrees of stretching of one of the main wings during the build-up and reduction of stress.
Figure 3:
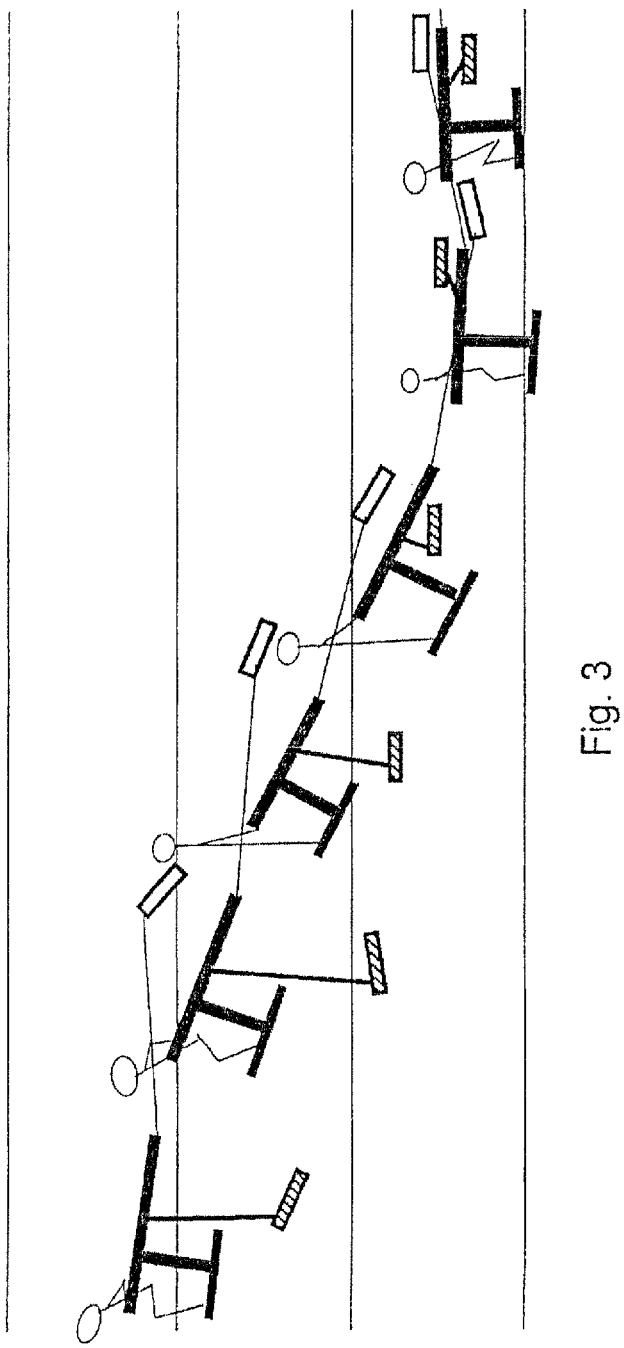
FIG. 3 is a side-view example of the interplay of pilot movement, the resulting energy input, the utilization of the pitch elevator, as well as the flapping motion of the main wings, as envisaged for the climbing flight.
Figure 4:
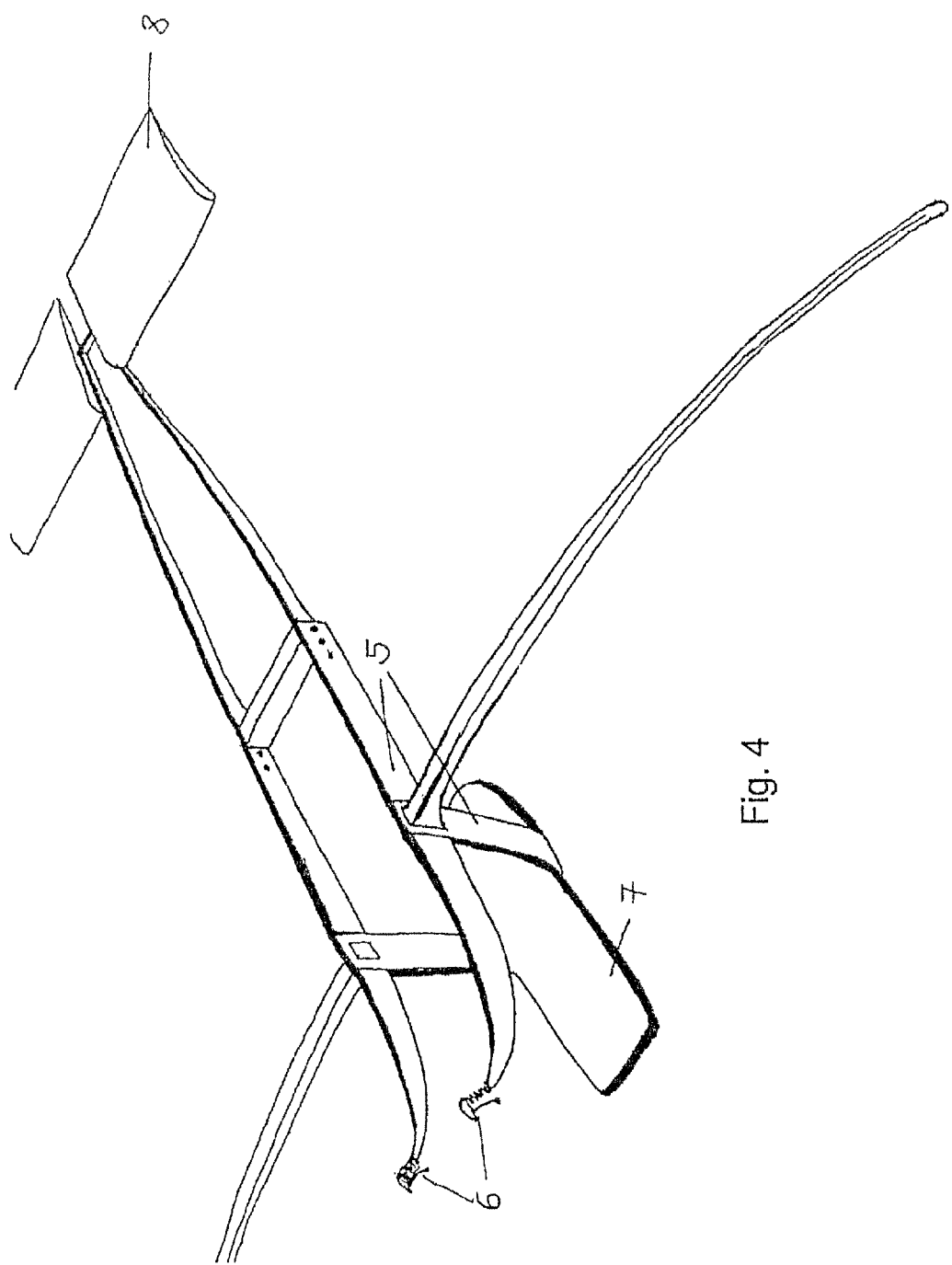
FIG. 4 shows a perspective representation of one embodiment of the ornithopter without main wing covering.

FIG. 4 depicts a schematic overall view of the aircraft. The aircraft comprises a flexible fuselage 5 in the form of a frame with a downwardly adjoining stand 7 for the pilot. Free space is provided behind the pilot stand in the direction of flight to enable the pilot to position himself behind stand 7, in order to carry the aircraft. Furthermore, hand grips 6 are mounted on frame 5 in the direction of flight. The hand grips are provided with mechanical devices that enable the aircraft rudders to be operated (not shown in the diagram). The flapping wings are attached on either side of the flexible fuselage 5, as is depicted only symbolically by a spar 9 in FIG. 4. The spar 9 is surrounded by a profile as depicted in FIG. 1. The connection between the fuselage 5 and the spar 9 is rigid, while both the fuselage 5 and the spar 9 have a flexibility that enables the wings to have a flapping motion. The flapping motion of the wings is diagrammatically illustrated in FIG. 2. With reference to FIG. 2, position 2 shows the wing position that is taken up with only the weight of the pilot when gliding. By way of contrast, position 1 shows a stroke upwards. This is achieved when the weight of the pilot takes effect on the pilot stand 7 with twice the earth acceleration, which occurs when the pilot jumps upwards from the pilot stand. Position 3 shows the wing in the resting position, i.e. without stress from the weight of the pilot. Position 4 shows the flapping wing with a maximum downward stroke. The downward stroke can be generated by a negative lift exerted on the wing by a rudder position within the outer wing region. FIGS. 6 to 15 explain the detailed motion sequence during the flight phases.

Once again with reference to FIG. 4 in the direction of flight, a tail boom connects with the rear portion of frame 5, to which a pitch elevator 8 is attached. This pitch elevator 8 may be adjusted by a mechanical device (not shown in the illustration).

The mode of operation of the aircraft with flapping wings according to the invention is based on replication of the sequence of motions performed by a bird during flight and the phased withdrawal of the weight of the pilot from the aircraft, preferably during downward stroke of the wing. It is envisaged that the pilot will carry the aircraft at the start and that he will run against the wind and jump on to the there open fuselage from behind. When jumping, he should be at an elevated place and jump a long way forward so as to lose as little travel as possible. The following force input for the flapping of the wings takes place immediately and without losses directly in the frame, which is connected with the roots of the wings, wherein the pilot repeatedly and rhythmically stretches and jumps on the ornithopter. When jumping, the timing of maximum body acceleration has to be selected so that it results in the greatest possible stretching of the wings, since it is in this shape that the wing produces maximum uplift and consequently presents the maximum resistance against body acceleration. At this point, the ornithopter should be in a slight declination/gliding flight so that part of the energy that has been acquired can be converted into speed. The pilot jumps forward. Shortly before completing the jump, his acceleration diminishes. Once the point of equilibrium between the acquired energy and the stored energy has been bridged, the spars and the fuselage of the ornithopter start to release their stored energy. On completion of the jump, the weight of the pilot no longer applies stress to the aircraft and he would find himself in an upward ballistic trajectory upward and ahead of the aircraft, unless he used the elevator unit to bring the ornithopter into a climbing flight parallel to his flight path. In the absence of the obstructive weight of the pilot, the ornithopter may now utilise the entire amount of energy being released for its climbing flight and for acceleration. With time, the flight path of the pilot flattens out and he has to retract his legs in order not to obstruct the continuing climbing flight of the ornithopter and to prepare himself for the next jump. In this way, alternatingly first the pilot and then the ornithopter gain in height and travel. During the course of the upward and downward flapping of the wings, the pilot can assist the aforementioned movement by means of the adjustable wing tips.

FIG. 1 depicts a schematic representation of the wing with a rigid profile in the region close to the fuselage and an alterable profile in the outer wing region. The wing region close to the fuselage does, however, have a wrenching in an alternate direction, however, it is configured rigidly. Less uplift is generated by the different profiling with increasing distance (a, b, c) from the fuselage. Outer wing region II is deformable and serves to control the flapping of the wing. The profile can be changed in the depicted embodiment. A rudder in the region of the trailing edge of the wing can be provided for the same purpose, according to the alternative embodiment. A cross-sectional view of outer wing region II is shown in FIG. 1a. The illustration shows the mechanism for adjusting the wing profile. The region of the wing's leading edge is made of flexible material that may be transferred in the longitudinal direction of the flight path at the underside of the wing. The region of the wing's leading edge can be altered in height by pushing the upper shell of the wing with respect to the lower shell of the wing.

For the phase involving downward wing stroke, the pilot temporarily withdraws his body weight from the aircraft by jumping upwards beforehand. At the same time, he operates the pitch elevator and forces the aircraft into a climbing flight. After jumping, the body of the pilot follows the aircraft ballistically for a short time. After this, the pilot applies stress to the aircraft. His body weight is carried by the uplift generated by the aircraft. In this phase, the pilot retracts his legs so as not to obstruct the continued climbing flight of the ornithopter and to prepare himself again for the next jump. In the following, FIGS. 6A to 15C explain how the energy is transferred to the aircraft by the pilot's movement.

Figure 5A:
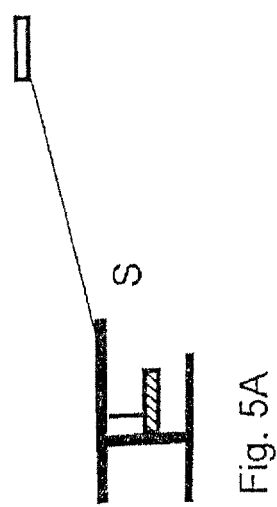
FIGS. 5A-C are a diagrammatic representation of the aircraft with flapping wings in resting position, wherein S represents the side view, A the top view and V the front view.
Figure 5B:
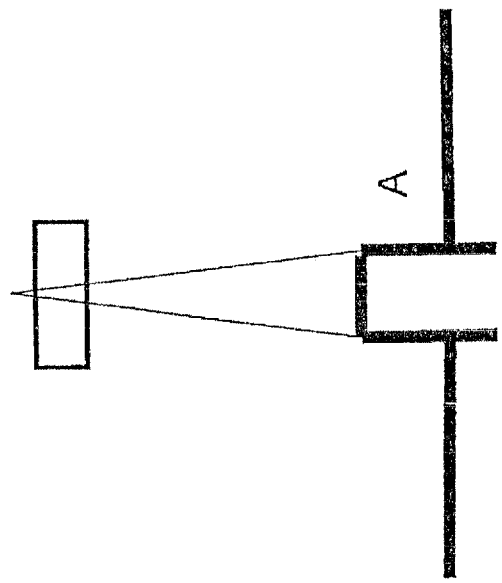
Figure 5C:
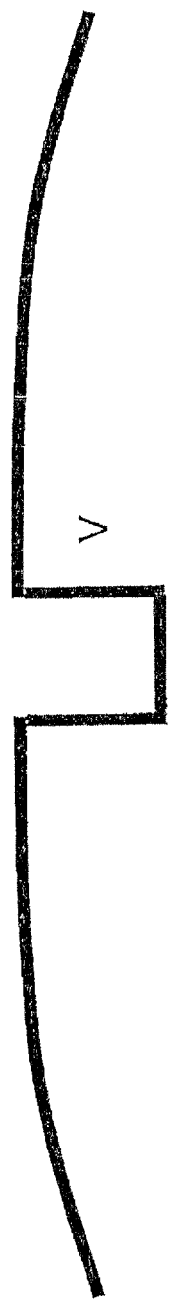

FIGS. 5A-C show the side, top and front views of the aircraft in the a resting position, respectively.

Front view V: The wings are curved downwards and in face of the growing headwind, tend to stretch because of the above-mentioned configuration and to automatically build up tension in the spars.

Side view S: The pitch elevator is in the neutral position as when gliding. Even the wing tips are in the neutral position.

Top view A: Both lateral wing spars exhibit a slightly negative sweep that is neutralised by air resistance in a growing headwind during flight and by the tension in the fuselage.

By way of example, FIGS. 6A-15C illustrate the technique of climbing flight in a step-by-step fashion while utilising the pitch elevator and rudders at the wing tips. The description relates in the sequence to (V) front view, (S) side view and (A) top view, respectively, and commences mid-flight with maximum body acceleration and maximum tension at the spars and frames.

FIGS. 6A-C:

V) Here the pilot is in the phase of maximum mass acceleration of his body. The cockpit frame is under maximum positive tension. The wings are under maximum positive tension and stretching, therefore offer maximum resistance to the accelerated body weight that is employed and thus enable the aircraft to act in the most efficient manner as a counter bearing against body acceleration. Hence, the energy that is brought about can be converted partly into an already initiated upward path for the pilot's body and into the acceleration of the aircraft that is on a slightly descending flight path. The precondition here is that the wings do not overstretch in this.

S) The direction of flight of the aircraft points slightly downwards. The energy applied by body acceleration can be very efficiently converted into propulsion. The pitch elevator is in the neutral position. The rudders at the wing tips generate some uplift in support of wing stretching and consequently are put in the neutral position in order to minimise air resistance.

A) Also in the top view, the frame is under maximum positive tension. The negative sweep of the wing spars that thus arises is a motion component of the already mentioned rudder flight. The wings are "reaching back".

FIGS. 7A-C:

V) The body acceleration of the pilot diminishes and consequently the weight stressing the wings decreases. Because of this stress reduction, the wing spars can now release the tension and convert this energy into acceleration, especially in region c.

Even the cockpit frame is supportive in transferring tension to the wing spars. The rudders at the wing tips are in the neutral position so as to minimise air resistance in this region.

S) The flight direction of the aircraft points slightly downwards and subsequently approaches a horizontal position. During this phase, the pilot sets the pitch elevator in order to initiate the now following climbing flight. The rudders at the wing tips are now in the neutral position in order to minimise air resistance in this region.

A) The wing tips consequently follow the rudder motion and move backwards and forwards. The fuselage continues to impart supportive tension in this.

FIGS. 8A-C:

V) The body acceleration of the pilot with respect to the aircraft diminishes further. He does not provide the aircraft with any more energy and is in an upward ballistic flight phase to the front. The aircraft is in climbing flight and follows him. The cockpit frame begins to release tension. The wing spars divest themselves of their remaining tension. As the weight of the pilot does not apply stress to the aircraft during this phase, this last energy discharge can be converted into a gain of height. The pilot supports the swing of the wings by adjustment of the respective wing region II.

S) The pilot and the aircraft are in parallel ballistic flight paths. The pitch elevator is set on full for a short time to bring the aircraft into a climbing flight. The rudders at the wing tips are fully set and therefore support the downward beat of the wings.

A) The cockpit frame begins to release tension and the rudder motion is continued.

FIGS. 9A-C:

V) Both wings continue to flap downwards with respect to the fuselage, beyond the resting position of the spars, and supported by the set wing regions II. Both wing tips are thereby leveraged towards each other in a curve following the wings' curvature. Together with the continuing climbing flight, this leverage results in an additional gain in height for the ornithopter, since the weight of the pilot does not counteract. After this, the above-mentioned leverage is maintained and then begins to act against the pilot, whose ballistic flight path flattens out. Negative tension is gradually built up in the wing spars and in the cockpit frame.

S) The pitch elevator points in the direction of flight. The rudders at the wing tips generate propulsion in relation to the wing spar, but do not negatively affect climbing flight because of the flight path of the aircraft and the increasing curvature of the wings. The ballistic flight paths of the pilot and the aircraft approximate each other.

A) The negative tension in the cockpit frame increases here as well. The rudder motion continues.

FIGS. 10A-C:

V) As the lines of the flight paths of the pilot and of the aircraft intersect in this phase, the pilot draws in his legs in order to prevent his weight from counteracting too early the continuing climbing flight of the aircraft and the leverage effect of the wings. In this phase the wings attain their maximum negative tension and the upward leverage moment is concluded. At the end of this phase, the pilot can and must compensate for the contrary leverage arising from the swinging back of the wings by fully turning round the rudders on the wing tips so that the flight wind in consequence pushes apart both wing regions H and the wings are once again forced into a stretched position. At the same time, the cockpit frame is under maximum negative tension which is consequently now released, thereby supporting the upswing of the wings.

S) The flight path of the pilot continues to flatten out and he retracts his legs in the direction of his centre of mass in order to avoid counteracting the continuing climbing flight of the aircraft. At the end of this phase, the pilot will use the pitch elevator to bring the aircraft out of its climbing flight in the direction of a horizontal flight position.

A) The cockpit frame has exceeded its maximum negative tension. Both wing spars have reached their maximum positive sweep. Rudder motion is continued.

FIGS. 11A-C:

V) The pilot has turned around the rudders at the wing tips in such a manner that the wings are forced back into the stretched position with the aid of the negative tension that is being released. In so doing, they will now support moderate climbing flight. The pilot continues to draw in his legs in order not to obstruct the moderate climbing flight of the aircraft.

S) The pilot is now in a horizontal flight path and continues to draw in his legs. Thus the pilot and the aircraft approximate each other. The pitch elevator forces the aircraft into a horizontal flight direction.

A) The cockpit frame has started to reduce its negative tension. Hence it supports the upward flapping of the wings. The wing tips now move backwards and forwards during the course of rudder movement.

FIGS. 12A-C:

V) Now the flight paths of the aircraft and of the pilot (in his centre of mass) match and the weight of the pilot begins to support the upward flapping of the wings in relation to the fuselage and the reduction of negative tension in the wing spars, providing a counter bearing to the slowly increasing weight of the pilot. The pilot continues to draw in his legs, mainly to provide a bio-mechanically favourable starting position for the next mass acceleration phase. The negative tension slowly drops to zero.

S) The pitch elevator stands in the neutral position and keeps the aircraft on a horizontal flight path while it is inclined slightly upwards. The pilot continues to draw in his legs. The rudders at the wing tips are set and force the wings into a stretched position.

A) The cockpit frame is stress-relieved. The wing tips soon find themselves in a neutral position next to the pilot.

FIGS. 13A-C:

V) The cockpit frame and the wings are now relieved of stress. The weight of the pilot, the existing swing of the spars and the still set rudders at the wing tips force the wings into the stretched position. The pilot has completely drawn in his legs and awaits the time to jump up.

S) The pitch elevator is in the neutral position and keeps the aircraft on a horizontal flight path, with a slightly upward climbing position. In the meantime, the projected flight path of the pilot points downwards and is avoided by the aircraft. The aircraft and the pilot are losing energy. They get slower, but keep their height, while at the end of this phase the wings begin to build up positive tension. The wing tips are now at the same height as and next to the hips of the pilot. At the end of this phase, the pilot begins to shift his body to the front. By the resulting shift of the common centre of mass, the pilot succeeds in making the aircraft lower its nose, without having to actuate the pitch elevator.

A) The cockpit frame builds up tension. The wing spars have a negative sweep for constructional reasons, in spite of aerodynamic resistance.

FIGS. 14A-C:

V) The cockpit frame and the wings continue to build up tension. The weight of the pilot, the existing swing of the spars and the still set rudders on the wing tips continue to force the wings into a stretched position. By stretching his legs at the end of this phase, the pilot commences with body acceleration. He jumps forwards and upwards.

S) The aircraft slowly gains in travel, as it is on a slightly downward flight path. Wing regions II force the wings into a stretched position and are now located sideways next to the pilot.

A) The cockpit frame continues to build up positive tension. As a result of its construction, it drives the wing spars into a negatively swept position.

FIGS. 15A-C:

V) The cockpit frame has now reached its maximum positive tension. The wings have now attained their maximum positive tension. They now exhibit the largest possible projected surface area because of their elongate stretched position and their horizontal position and thus serve to provide an optimum counter bearing against the prevailing body acceleration of the pilot, who is heaving himself up.

S) The pitch elevator is in a neutral position and the aircraft is on a moderate downward course. The ornithopter/pilot union gains in travel by the pilot bringing in energy.

The pilot heaves himself up and thus begins to bring energy into the system. The rudders at the wing tips are still set and produce uplift in order to counteract loss of height and to further reduce the positive tension of the frame and the wings.

A) The cockpit frame now stands under maximum positive tension. The negative sweep is most significant in this phase.

Figure 6A:
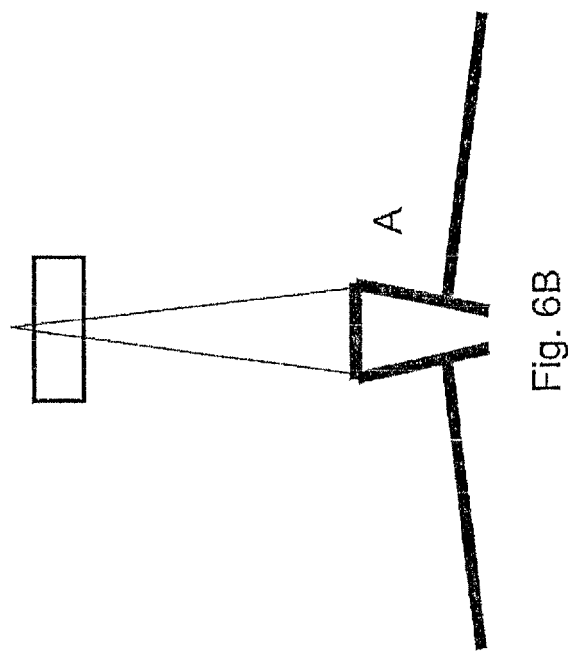
Figure 6B:
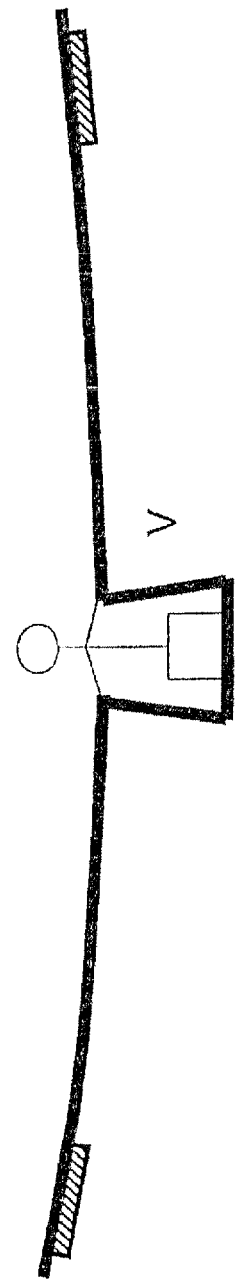
Figure 6C:
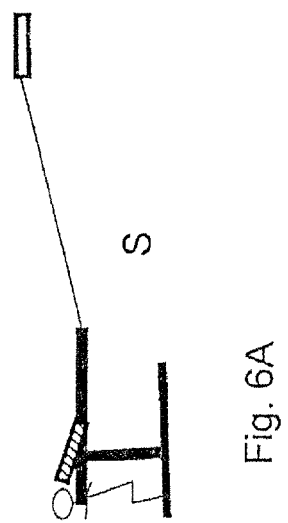
Figure 9A:
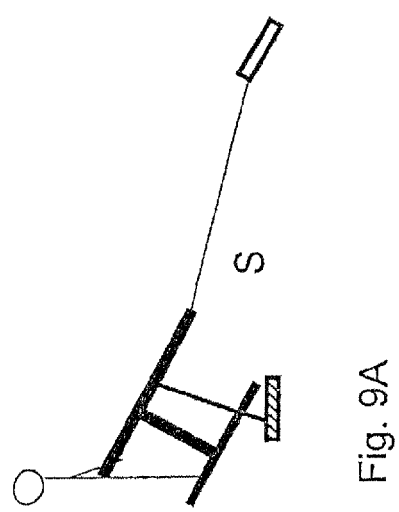
Figure 9B:
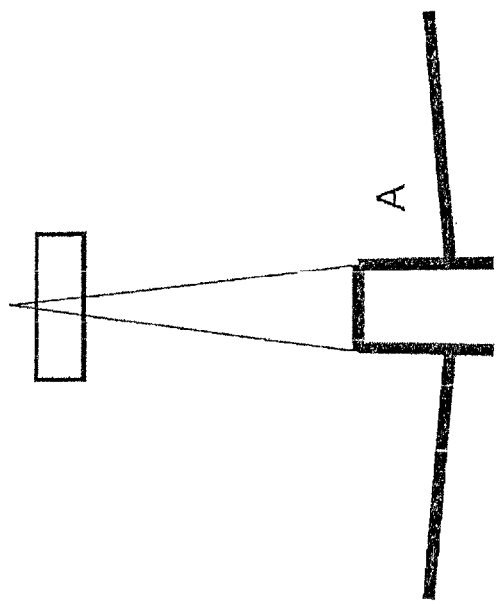
Figure 9C:
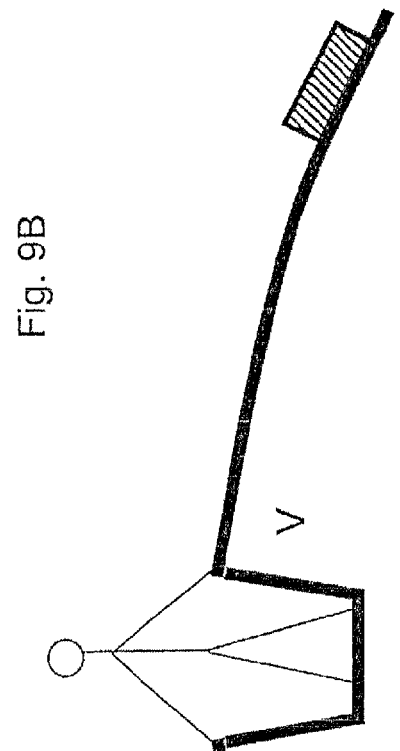
Figure 10A:
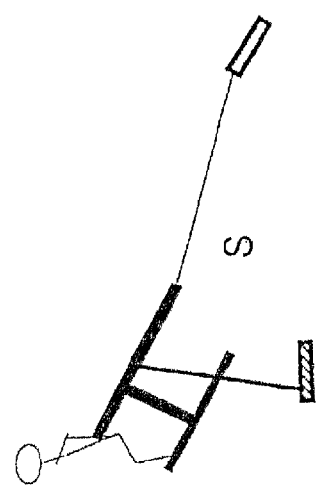
Figure 10B:
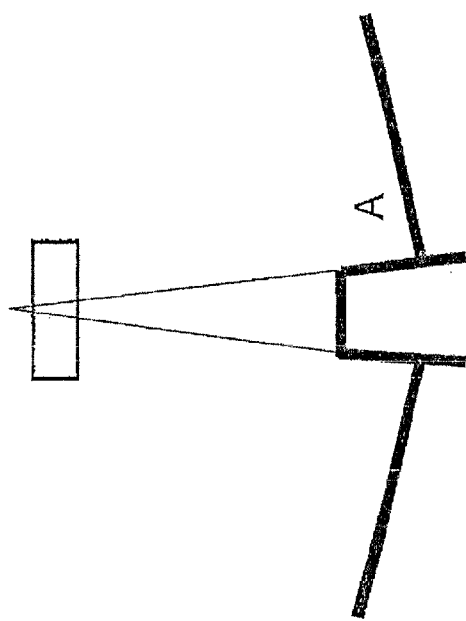
Figure 10C:
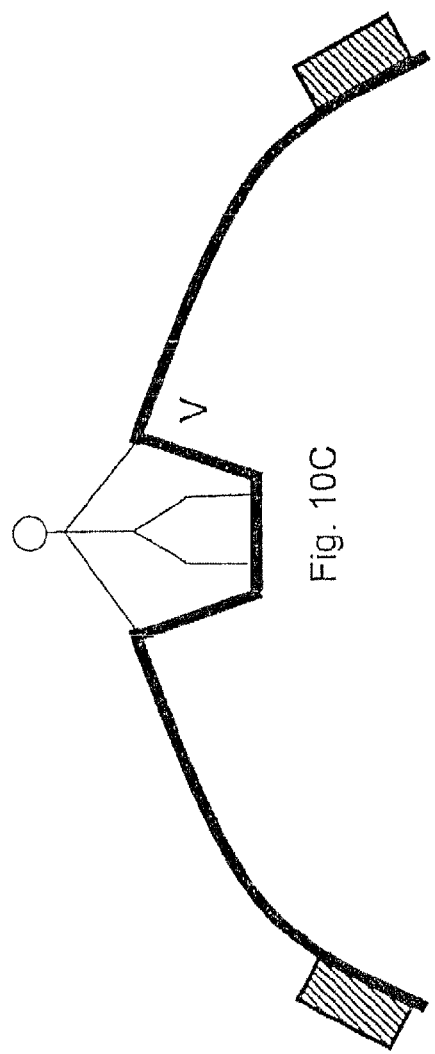
Figure 11B:
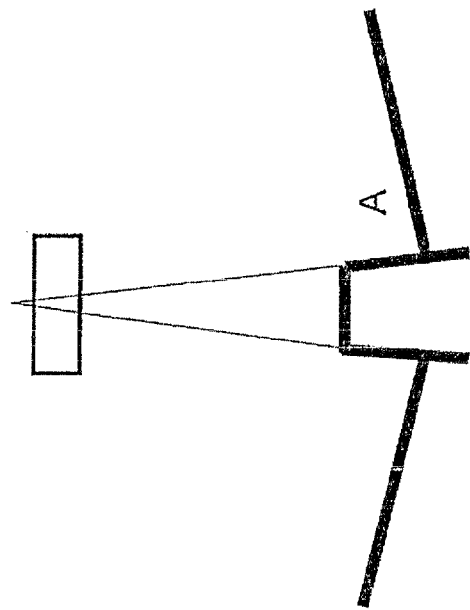
Figure 11C:
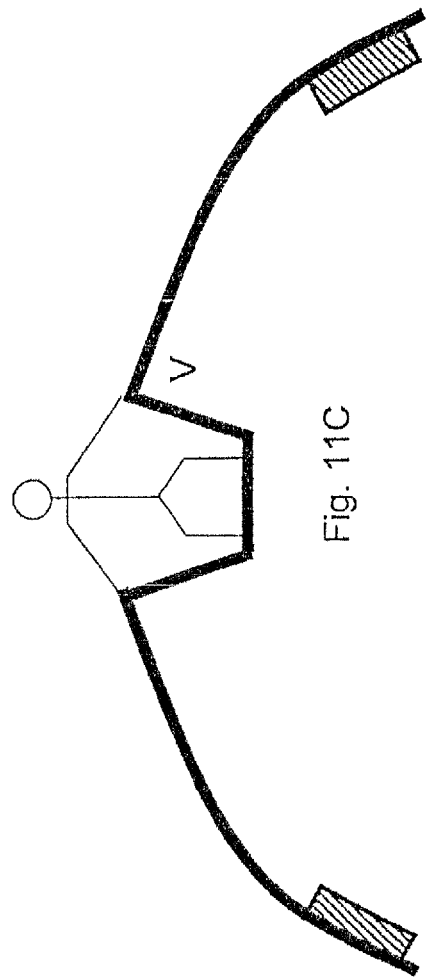
Figure 11A:
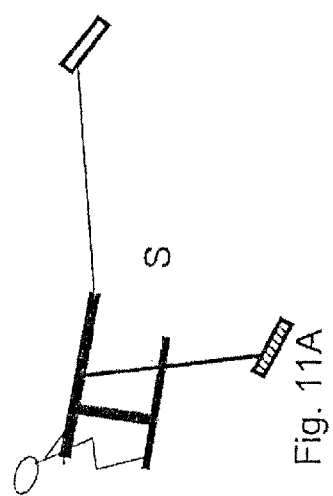
Figure 13A:
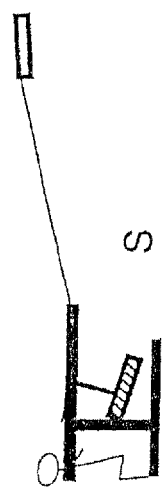
Figure 13B:
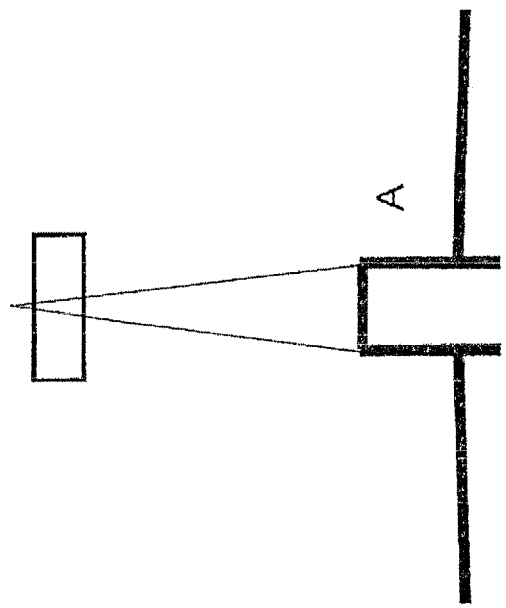
Figure 13C:
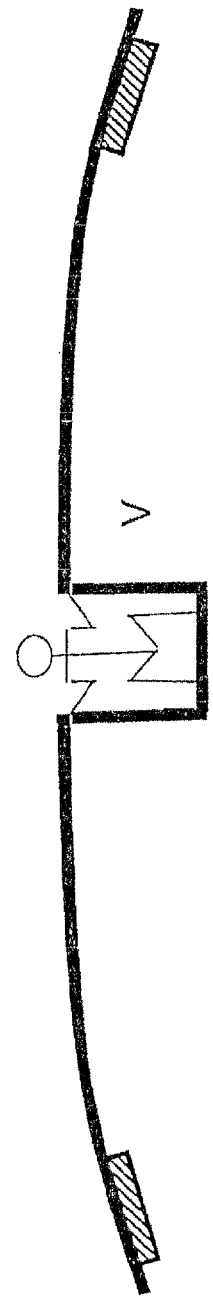
Figure 14A:
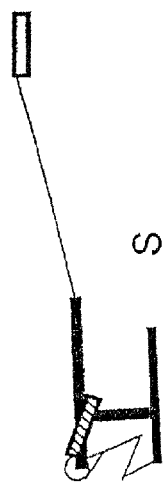
Figure 14B:
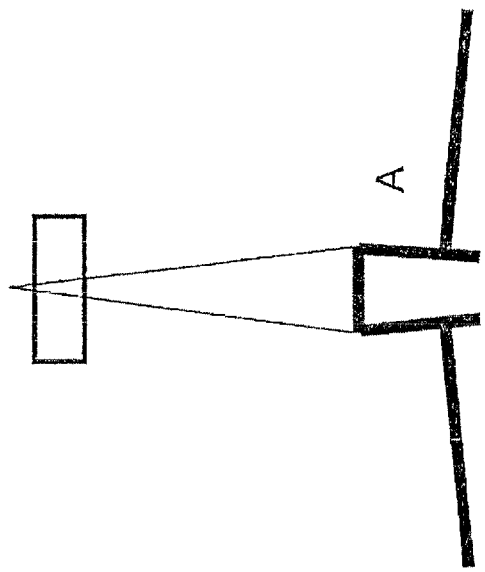
Figure 14C:
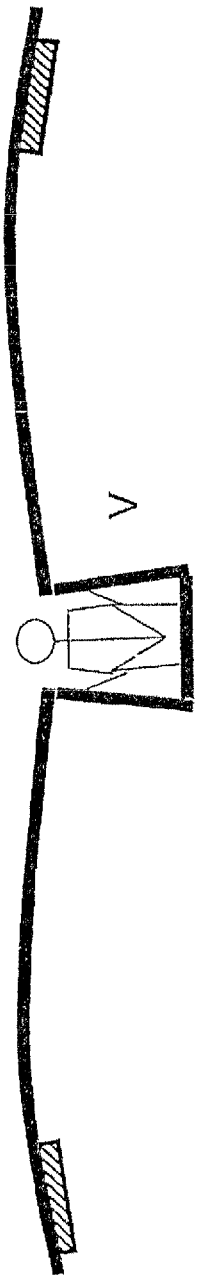
Figure 15A:
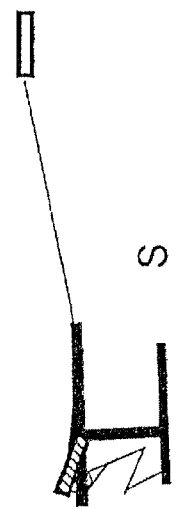
Figure 15B:
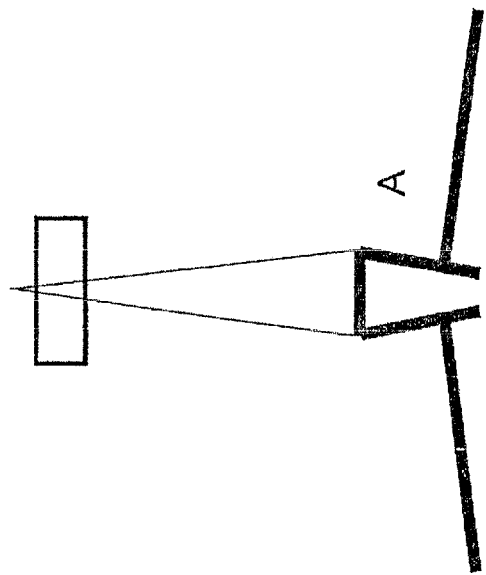
Figure 15C:
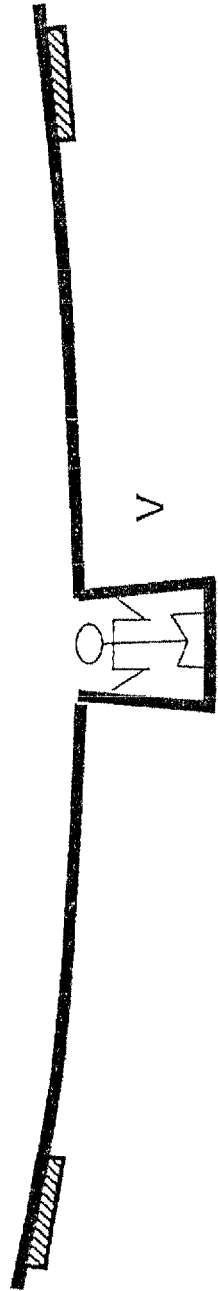

The above-mentioned movement phases and sequences directly pass over to the sequences described in FIG. 6 and so on.

LIST OF REFERENCE NUMERALS

1. Maximum up-beat>2 g stress
2. Gliding flight 1 g stress
3. Resting position
4. Maximum down-beat
5. Fuselage, particularly as frame construction
6. Hand grips
7. Pilot stand
8. Pitch elevator
9. Spar
I Wing region with fixed profile
II Wing region with alterable profile

What is claimed is:

1. A muscle-powered aircraft that comprises the following:
a fuselage having an inner flexible frame that is elastically deformable transversely to the aircraft's longitudinal axis,
a pair of flapping wings having an alterable profile or rudder in an outer wing region (II) at a distance from the fuselage enabling alteration of the uplift in a predetermined flow, and
an elevator unit with alterable pitch elevator deflection,
wherein the pair of flapping wings and the fuselage are shaped from an elastic material having an elasticity that makes possible a flapping motion of the pair of flapping wings in a rigid connection with the fuselage, wherein said rigid connection is rigid in all directions, wherein the flapping wings when in a resting position are curved downwards and wherein said elasticity is such that when in flight the flapping wings are forced into a neutral position by the weight of a pilot,
wherein the fuselage is configured to accommodate the pilot in an upright position with respect to a longitudinal axis of the fuselage so that the pilot can apply stress to and relieve stress from the aircraft in phases by stretching and drawing in the legs,
wherein the flexible inner frame surrounds the pilot on at least two sides and the flapping wings are mounted on said at least two sides,
the aircraft with flapping wings further having mechanical devices which facilitate an actuation of the alterable profile or rudder in the outer wing regions and of the alterable pitch elevator deflection in phase with the movement of the flapping wings.

2. The aircraft with flapping wings according to claim 1, wherein the fuselage and the wings at least in part are shaped from a flexible monocoque structure.

3. The aircraft with flapping wings according to claim 1, wherein the alterable outer wing regions (II) are constituted by at least one rudder in the region of the trailing edge of the wing.

4. The aircraft with flapping wings according to claim 1, wherein the flapping wings have one or more parallel spars which are connected with the fuselage and which extend at least to the outer regions of the wings.

5. The aircraft with flapping wings according to claim 1, wherein the alterable outer wing regions and/or the pitch elevator deflection can be operated manually by the pilot via control rods and/or cable pulls.

6. The aircraft with flapping wings according to claim 1, wherein a shape of a covering of the flapping wings alters on moving the outer wing regions (II).

7. The aircraft with flapping wings according to claim 1, wherein a dampening element dampens the fuselage vibration.

8. The aircraft with flapping wings according to claim 7, wherein the dampening element for the fuselage is controllable.

9. The aircraft according to claim 1, wherein the elasticity of the flapping wings changes along one or more spars of the wing.

10. The aircraft according to claim 9, wherein the elasticity of the flapping wing increases across a portion of the area from a location (a) closer to the fuselage to a location (b) further away from the fuselage and/or the elasticity decreases across a further portion from a location (b) closer to the fuselage to a location (c) further away from the fuselage.

11. A method of operating a muscle-powered aircraft that comprises the following:
a fuselage having an inner flexible frame that is elastically deformable transversely to the aircraft's longitudinal axis,
a pair of flapping wings having an alterable profile or rudder in an outer wing region (II) at a distance from the fuselage enabling alteration of the uplift in a predetermined flow, and
an elevator unit with alterable pitch elevator deflection,
wherein the pair of flapping wings and the fuselage are shaped from an elastic material having an elasticity that makes possible a flapping motion of the pair of flapping wings in a rigid connection with the fuselage, wherein the flapping wings when in a resting position are curved downwards and wherein said elasticity is such that when in flight the flapping wings are forced into a neutral position by the weight of a pilot,
wherein the fuselage is configured to accommodate the pilot in an upright position with respect to a longitudinal axis of the fuselage so that the pilot can apply stress to and relieve stress from the aircraft in phases by stretching and drawing in the legs,
wherein the flexible inner frame surrounds the pilot on at least two sides and the flapping wings are mounted on said at least two sides, the aircraft with flapping wings further having mechanical devices which facilitate an actuation of the alterable profile or rudder in the outer wing regions and of the alterable pitch elevator deflection in phase with the movement of the flapping wings, wherein the pilot applies stress to and relieves stress from the aircraft in phases by a leg movement.

12. The method according to claim 11, wherein the pilot operates the outer wing region (II) in phase with applying and relieving the stress.

13. The method according to claim 11, wherein the pilot completely relieves the stress from the aircraft in phases.

14. The method according to claim 11, wherein the pilot steers the aircraft by horizontal displacement of his body weight about a longitudinal and a lateral axis.

* * * * *